US012618673B2

(12) United States Patent
Beitia

(10) Patent No.: US 12,618,673 B2
(45) Date of Patent: May 5, 2026

(54) VIBRATORY GYROSCOPE SENSOR

(71) Applicant: Halliburton Energy Services, Inc., Houston, TX (US)

(72) Inventor: José Louis Beitia, Lyons (FR)

( * ) Notice: Subject to any disclaimer, the term of this patent is extended or adjusted under 35 U.S.C. 154(b) by 203 days.

(21) Appl. No.: 18/371,951

(22) Filed: Sep. 22, 2023

(65) Prior Publication Data

US 2024/0102804 A1     Mar. 28, 2024

(30) Foreign Application Priority Data

Sep. 23, 2022     (FR) .................................. FR2209680

(51) Int. Cl.
G01C 19/5705          (2012.01)
(52) U.S. Cl.
CPC ................................. G01C 19/5705 (2013.01)
(58) Field of Classification Search
CPC ................................................. G01C 19/5691
See application file for complete search history.

(56) References Cited

U.S. PATENT DOCUMENTS

| | | | |
|---|---|---|---|
| 5,218,867 A | 6/1993 | Varnham et al. | |
| 5,445,007 A | 8/1995 | Varnham et al. | |
| 5,471,875 A | 12/1995 | Sato et al. | |
| 6,272,925 B1 * | 8/2001 | Watson ................ | G01C 19/567 73/504.12 |
| 7,240,533 B2 | 7/2007 | Fell et al. | |
| 7,281,425 B2 | 10/2007 | Chikovani et al. | |

| | | |
|---|---|---|
| 7,513,156 B2 | 4/2009 | Chikovani et al. |
| 7,526,957 B2 | 5/2009 | Watson |
| 7,607,350 B2 | 10/2009 | Choi |
| 7,617,727 B2 | 11/2009 | Watson |
| 8,011,245 B2 | 9/2011 | Yatzenko et al. |
| 8,910,520 B2 | 12/2014 | Jeanroy |
| 8,991,247 B2 | 3/2015 | Trusov et al. |
| 8,991,249 B2 | 3/2015 | Jeanroy |
| 9,217,640 B2 | 12/2015 | Lignon et al. |
| 9,322,655 B2 | 4/2016 | Chikovani et al. |
| 9,476,710 B2 | 10/2016 | Chikovani et al. |
| 9,574,902 B2 | 2/2017 | Okon et al. |

(Continued)

FOREIGN PATENT DOCUMENTS

| | | |
|---|---|---|
| CN | 101968359 B | 11/2011 |
| CN | 112629514 A | 4/2021 |

(Continued)

OTHER PUBLICATIONS

Search Report dated Feb. 5, 2024 issued in corresponding European Application No. 23198711.

(Continued)

*Primary Examiner* — Mark A Shabman
(74) *Attorney, Agent, or Firm* — DeLizio, Peacock, Lewin & Guerra LLP

(57)          ABSTRACT

A vibratory gyroscope sensor is provided. The vibratory gyroscope sensor consists of a base, and a resonator that includes a central foot attached to the base and a sidewall that rises from the foot up to a free end edge delimiting an opening. The sidewall has a proximal portion that extends from and around the foot and a cylindrical distal portion that extends in line with the proximal portion up to the free edge with the proximal portion progressively widening from the foot towards the distal portion.

13 Claims, 11 Drawing Sheets

(56)  References Cited

U.S. PATENT DOCUMENTS

| | | | | |
|---|---|---|---|---|
| 9,671,247 | B2 | 6/2017 | Okon et al. | |
| 9,702,697 | B2 | 7/2017 | Stewart et al. | |
| 9,709,399 | B2 | 7/2017 | Liu | |
| 10,422,641 | B1 * | 9/2019 | Perahia | G01C 19/5691 |
| 10,718,615 | B2 | 7/2020 | Jandak et al. | |
| 2007/0095161 | A1 * | 5/2007 | Delevoye | G01C 19/5691 |
| | | | | 74/5 R |
| 2007/0240508 | A1 * | 10/2007 | Watson | G01C 19/5691 |
| | | | | 73/504.12 |
| 2009/0031832 | A1 * | 2/2009 | Choi | G01C 19/5691 |
| | | | | 74/5.6 D |
| 2014/0360266 | A1 * | 12/2014 | Su | G01C 19/5691 |
| | | | | 73/504.13 |

FOREIGN PATENT DOCUMENTS

| | | | |
|---|---|---|---|
| EP | 1711778 | B1 | 12/2009 |
| EP | 2669629 | A1 | 12/2013 |
| EP | 2669629 | B1 | 3/2017 |
| EP | 3605018 | B1 | 1/2023 |
| FR | 2864226 | A1 | 6/2005 |

OTHER PUBLICATIONS

Search Report dated May 12, 2023 issued in corresponding French Application No. FR2209680.

* cited by examiner

VIBRATORY GYROSCOPE SENSOR

The present invention relates to the general technical field of rotation sensors, and more particularly that of gyroscope sensors based on Coriolis forces to measure rates of rotation and/or angular positions, such as Coriolis vibratory gyrometers or gyroscopes.

The present invention more particularly relates to a vibratory gyroscope sensor comprising a base, as well as a resonator that itself includes a central foot by which the resonator is attached to said base and a sidewall that rises from said foot up to a free end edge delimiting an opening.

Vibrating structure gyrometers for measuring angular velocities are well known. These vibratory gyrometers are based on Coriolis effect, which causes a vibrating object, having a 2nd-order resonance mode divided into a primary mode and a secondary mode that are modally orthogonal to each other, to undergo a force, when it rotates, to continue vibrating in a single and same plane in the mode space defined by the primary and secondary modes. Applying an opposite force makes it possible to rotate the vibration plane with the object. The vibration is then motionless relative to a rotating reference system linked to the object. Measuring this force makes it possible to determine the angular velocity.

When no force opposite to the Coriolis forces is applied, measuring the position of the reference system linked to the rotating object with respect to the vibration, which is itself fixed, gives directly the object angular position information. This operating mode is called gyroscope mode, by opposition to the previous operating mode, called gyrometer mode.

In particular, vibratory cylinder gyrometers are known, which use a base to which is fastened, by means of a central rod, a metal resonator having the shape of a pot with a cylindrical sidewall and a flat bottom provided with a sleeve for receiving the central rod. Piezoelectric elements are arranged on and against said cylindrical sidewall to excite the resonator into vibration and detect the vibrations of the latter.

These vibratory cylinder gyrometers have undergone various changes over the last few decades. In particular, a mushroom-shaped resonator has been proposed, which has a central foot fastened to the base and supporting a cylindrical cap with a flat top on which are arranged eight piezoelectric elements. This mushroom-shaped design was aimed in particular at reducing the dimensions and reducing the manufacturing costs. However, it induces, just like the above-mentioned flat-bottomed pot design, the presence of parasitic structural modes that affect the good operation of the control electronic system of the resonator, in particular in the presence of external vibrations as it is usually the case in an operational environment.

More precisely, with the vibratory cylinder designs of the prior art mentioned hereinabove, the occurrence of three parasitic modes is observed, i.e. a drum mode in which the flat bottom is deformed parallel to the main axis of symmetry of the resonator, a flexural mode on the central foot and a rotational mode in which the entire cylinder rolls around the foot, whose frequencies are close to those of the symmetrical primary and secondary modes used to detect the angular rotations or the angular velocities. Rejection of these parasitic modes is one of the main technical challenges as regards the Coriolis vibratory gyrometers implementing, in particular, a cylindrical resonator. Indeed, the parasitic modes prevent the implementation of high-bandwidth control electronics (for example, from several hundreds of Hz to about 1 kHz), required for example for high-end stabilization applications, insofar as singularities appear in the Nyquist phase diagram causing unstable control loops for the useful, primary and secondary, modes. Moreover, these parasitic modes are most often strongly coupled to external mechanical vibrations, including external mechanical impacts. Therefore, in the presence of such external vibrations, strong signals are likely to be detected and to disturb, or even saturate, the control electronics.

In order to overcome this problem, it has been proposed to use a greater number of piezoelectric elements, suitably connected to each other by means of an internal electronic module to obtain a natural rejection of the signals generated by the parasitic modes of the resonator, after suitable combination of the signals. However, this solution is not fully satisfying, because it generates increased complexity and cost, and does not prevent the parasitic modes to exist and to be stimulated when the resonator is subjected to external vibrations.

To solve this problem of occurrence of parasitic modes, an alternative design has been proposed, which is based on the implementation of elastomeric vibration isolators integrated to the base to mechanically isolate the resonator from the external system. Such a design makes it possible to reduce amplitude of the signals generated at the piezoelectric detection elements when the parasitic modes are coupled to external vibrations. However, such an arrangement is excessively expensive (especially when with respect to the use of individual suspension studs of the market) and may cause a rocking motion on the isolators under the effect of external transverse linear accelerations. This may cause, in certain situations, measurement errors at the sensor output, such errors being called "skew correction by conical movements".

The objects assigned to the invention thus aim to remedy the different drawbacks exposed hereinabove and to propose a new vibratory gyroscope sensor whose design, while being extremely simple and robust, allows in particular limiting the negative influence of the parasitic modes, an in particular limiting the occurrence of a "drum" parasitic mode in a frequency range close to that of the primary and secondary vibration modes used for the measurement, while limiting the sensor measurement errors.

Another object of the invention aims to propose a new vibratory gyroscope sensor that, while being extremely compact and light-weight, has a design that maintains the frequencies of the parasitic drum mode at values significantly higher than those of the frequencies of the primary and secondary modes, thus allowing a clear distinction to be made between primary and secondary modes of the parasitic drum mode and limiting the coupling between the primary and secondary modes and the parasitic drum mode.

Another object of the invention aims to propose a new vibratory gyroscope sensor easy and fast to manufacture industrially, and that allows obtaining extremely reliable measurements, while implementing a reduced number of vibration detection elements.

Another object of the invention aims to propose a new vibratory gyroscope sensor whose design allows, by construction, a particularly efficient separation of the frequency range of the parasitic "drum" mode from that of the primary and secondary modes.

Another object of the invention aims to propose a new vibratory gyroscope sensor whose design allows, by construction, a particularly efficient separation of the parasitic flexural mode frequency from the frequency range of the external mechanical environments that generally do not exceed 2 kHz.

Another object of the invention aims to propose a new vibratory gyroscope sensor whose shape makes it possible to significantly offset the frequencies of the parasitic rotational mode with respect to those of the primary and secondary modes.

Another object of the invention aims to propose a new vibratory gyroscope sensor whose resonator is arranged to optimally control the direction of the resonator vibration, without requiring an accurate positioning of the excitation and detection elements.

Another object of the invention aims to propose a new vibratory gyroscope sensor whose design allows reducing the mechanical stresses liable to be untimely exerted on the elements for detecting and exciting the vibration maintained in the resonator.

Another object of the invention aims to propose a new vibratory gyroscope sensor whose design allows a particularly efficient transmission of excitation efforts to the resonator, and reciprocally a reliable and accurate detection of the resonator vibrations.

Another object of the invention aims to propose a new vibratory gyroscope sensor making it possible to limit occurrence of additional parasitic modes.

The objects assigned to the invention are achieved by means of a vibratory gyroscope sensor comprising:

a base,
a resonator that includes a central foot by which the resonator is attached to said base and a sidewall that rises from said foot up to a free end edge delimiting an opening,
characterized in that said sidewall has a proximal portion that rises from and around said foot and a distal portion, generally cylindrical in shape, that extends in line with said proximal portion up to said free end edge, said proximal portion progressively widening from the foot towards the distal portion.

Other features and advantages of the invention will appear in more detail upon reading of the following description, with reference to the appended drawings, given by way of purely illustrative and non-limiting examples, in which.

Figure 7:
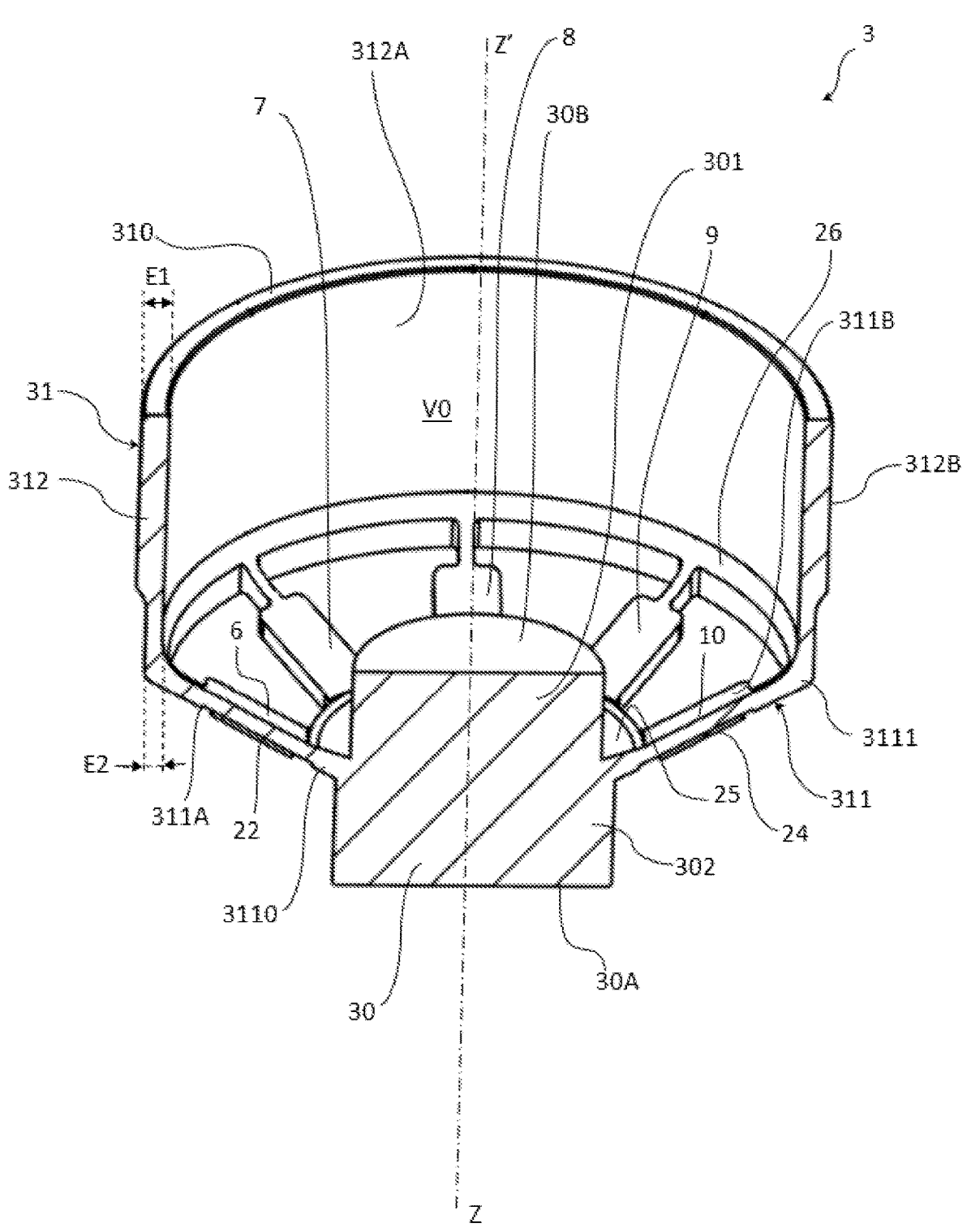

FIG. 7 illustrates the resonator of an axisymmetric vibratory gyroscope sensor in accordance with a second embodiment of the invention, which differs from the first embodiment of FIGS. 1 to 6 only in the external positioning of its elements for detecting and exciting the vibration maintained in the proximal portion of the resonator sidewall, whereas an internal positioning of said elements is on the contrary implemented in the embodiment of FIGS. 1 to 6.

Figure 8:
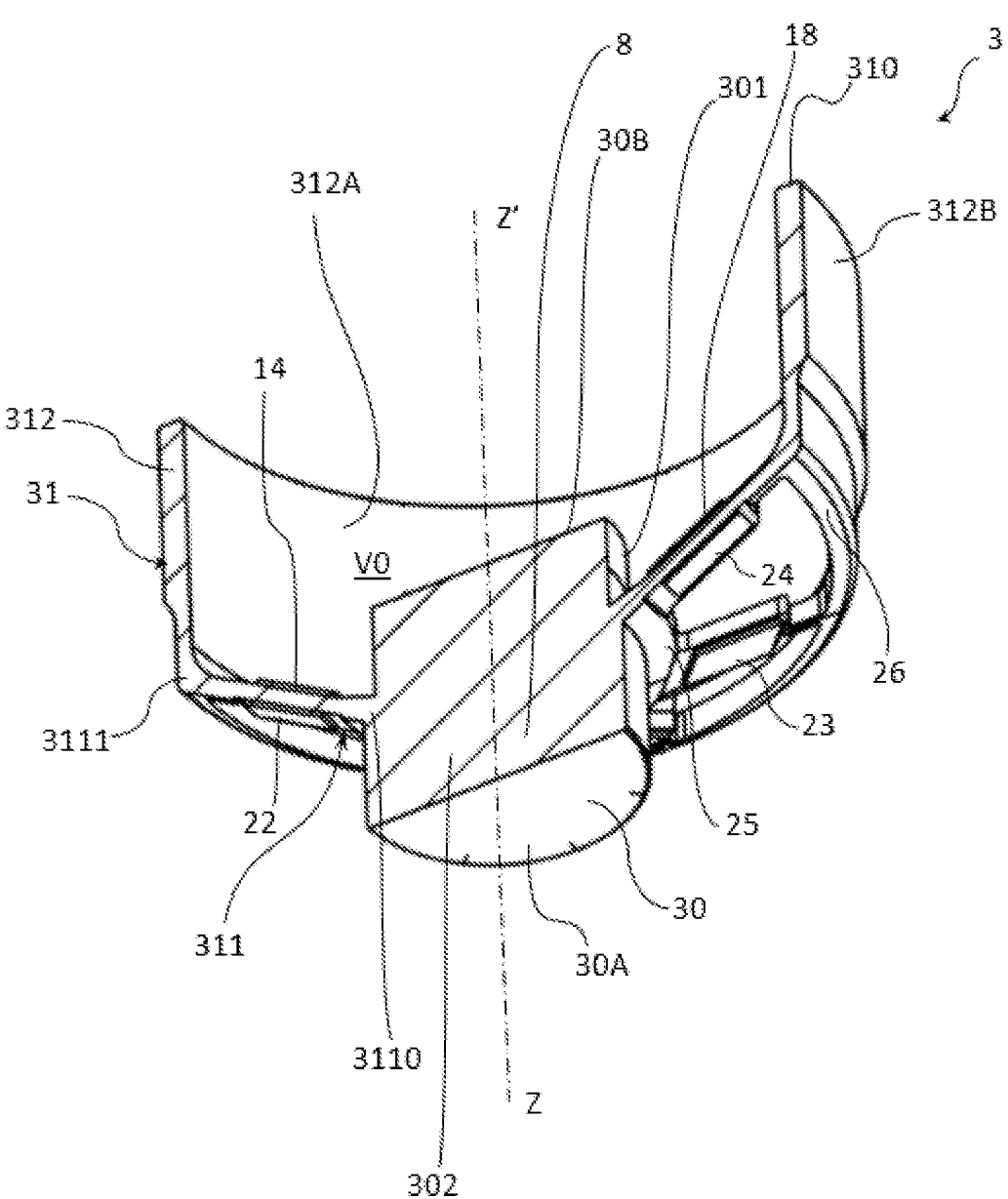

FIG. 8 illustrates, in a sectional perspective schematic view, a resonator of an axisymmetric vibratory gyroscope sensor according to a third embodiment of the invention, which is identical to the embodiments of the preceding figures, with the difference that it implements elements for detecting and exciting the maintained vibration that are positioned both internally and externally on the proximal portion of the resonator sidewall.

Figure 3:
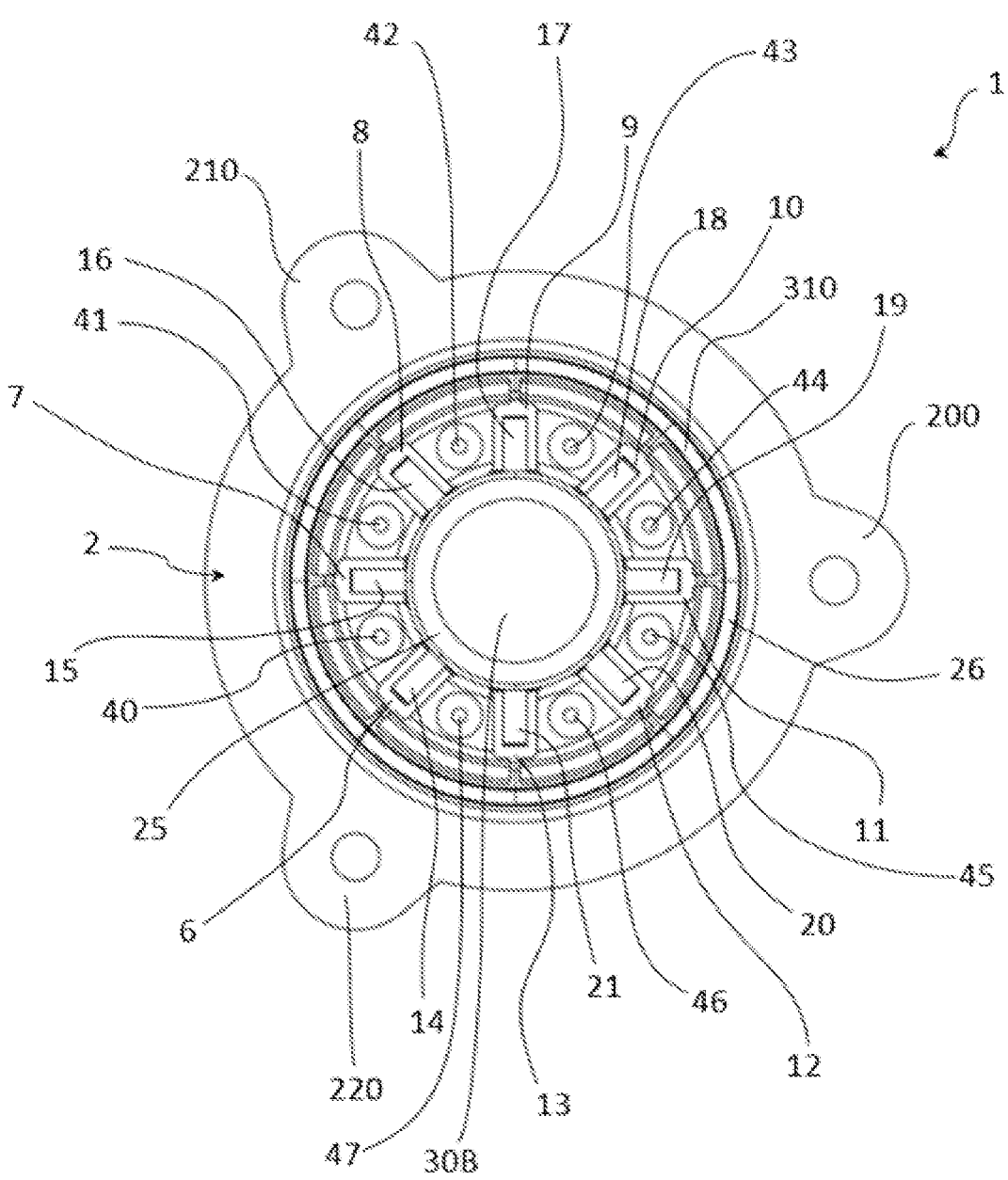
FIG. 3 illustrates, in a schematic top view, the vibratory gyroscope sensor of FIGS. 1 and 2, without its cap.
Figure 4:
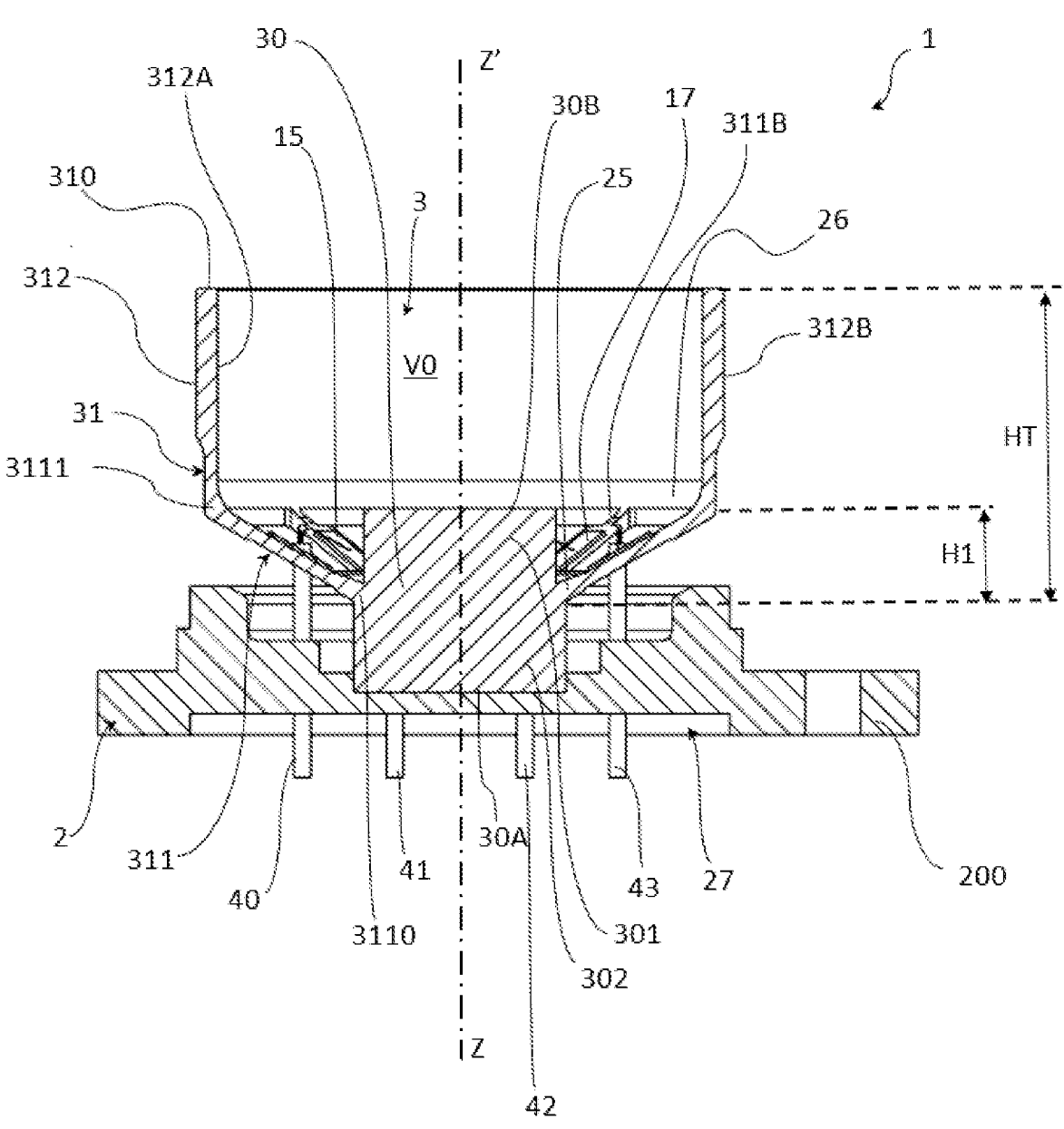
FIG. 4 illustrates, in a schematic sagittal section view, the vibratory sensor of FIG. 3.
Figure 5:
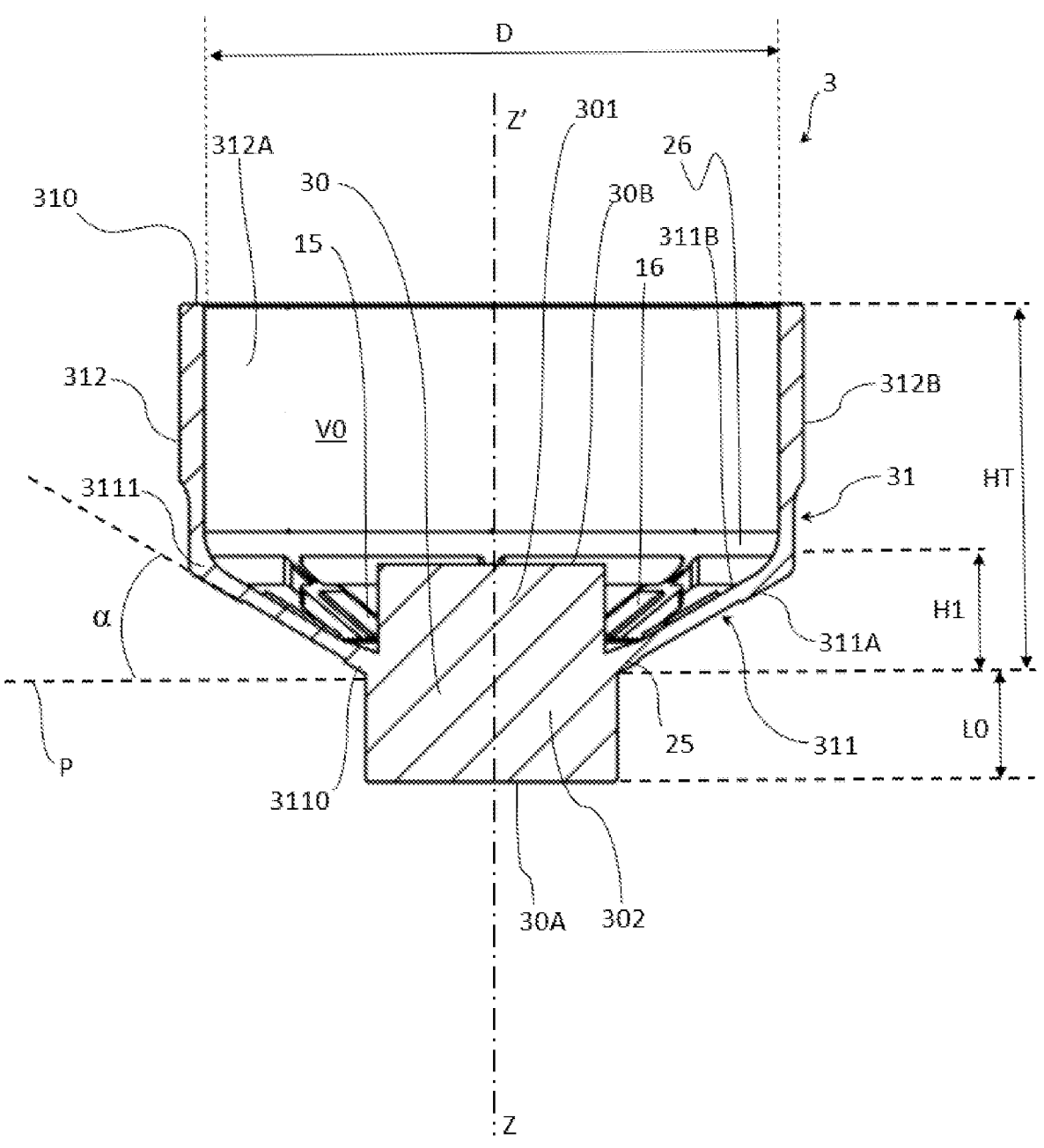
FIG. 5 is a view similar to that of FIG. 4 but in which only the resonator of the sensor is shown.
Figure 6:
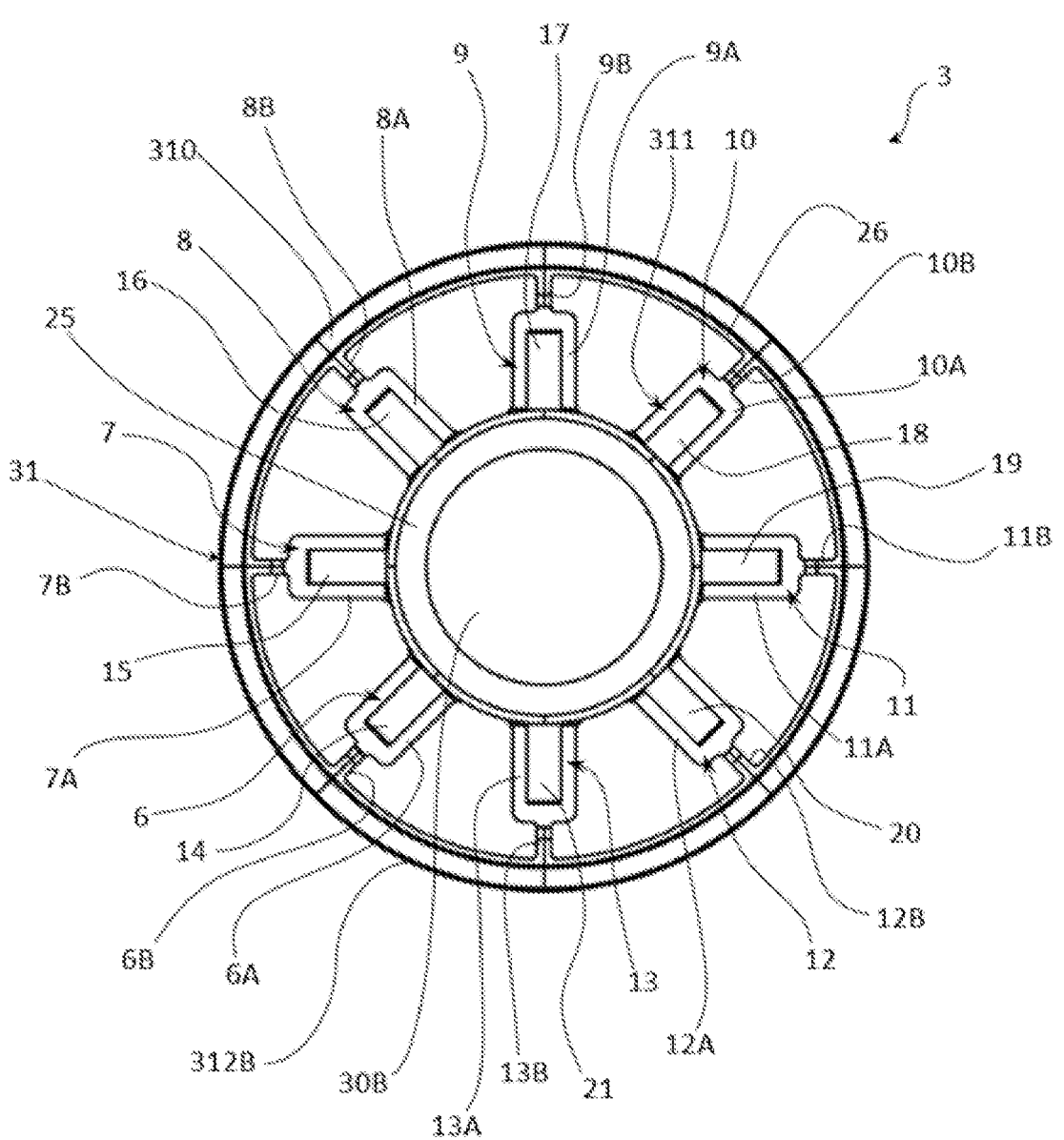
FIG. 6 illustrates, in a top view, the resonator of FIG. 5.
Figure 9:
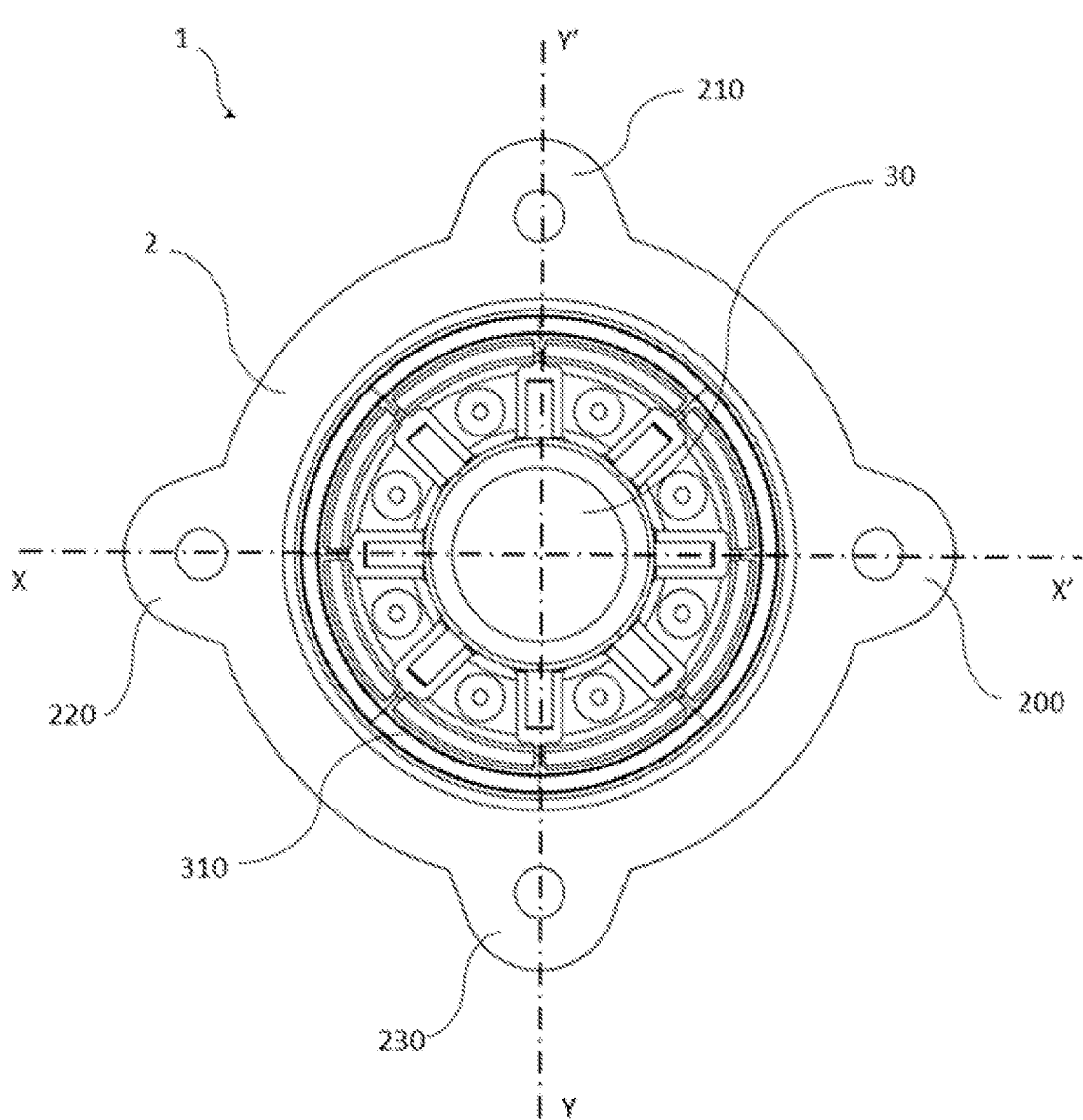

FIG. 9 illustrates, in a view similar to that of FIG. 3, an axisymmetric vibratory gyroscope sensor according to a fourth embodiment of the invention, which is different from the variant of FIG. 3 only in the number and positioning of the fastening lugs of the base (four fastening lugs instead of three in the embodiment of FIG. 3).

Figure 10:
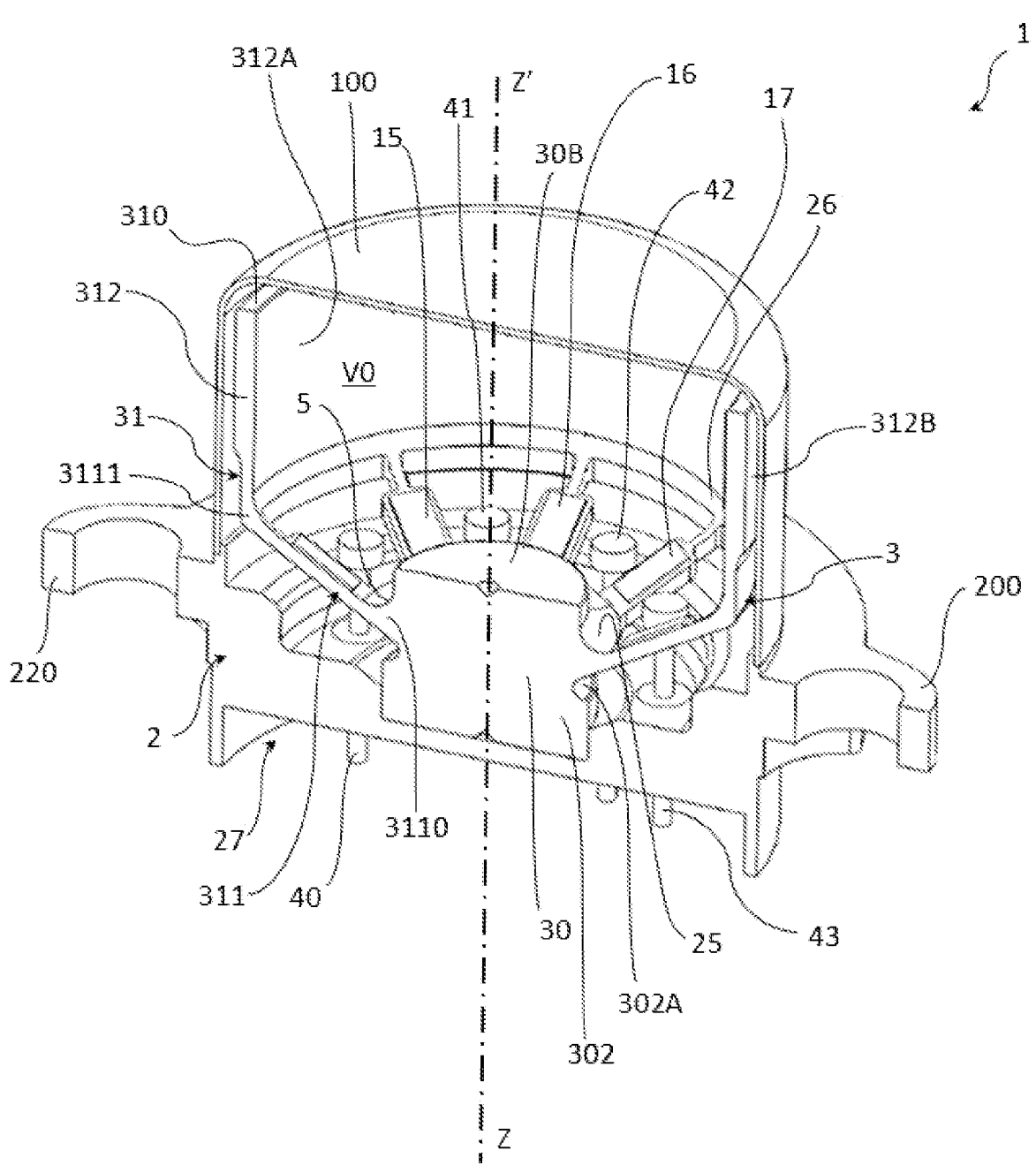

FIG. 10 illustrates, in a sectional perspective schematic view, an axisymmetric vibratory gyroscope sensor according to a fifth embodiment of the invention, which is different from the variants of the preceding figures by the specific conformation of the junction area between the proximal portion of the sidewall and the central foot.

Figure 11:
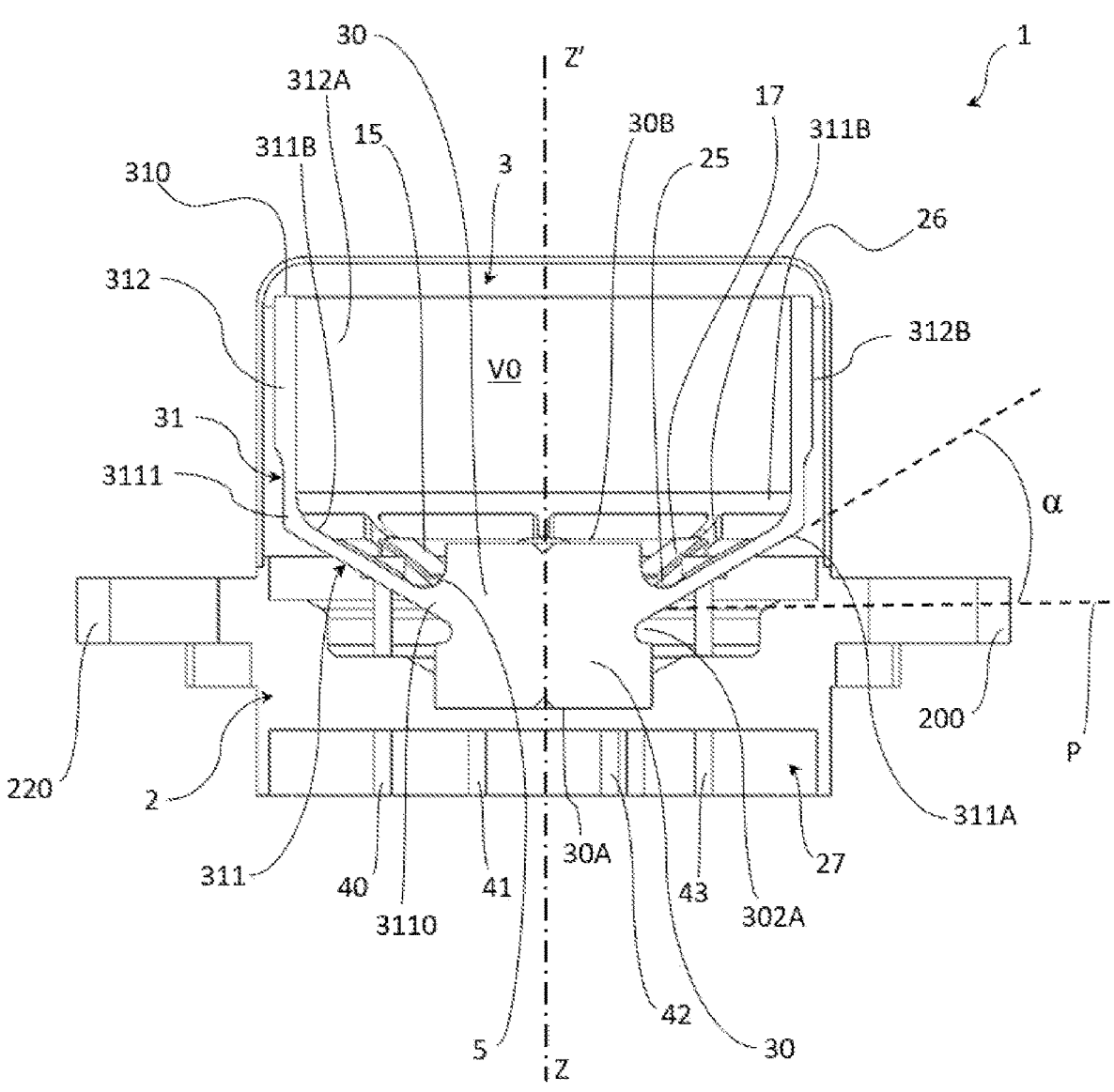

FIG. 11 illustrates, in a schematic sagittal section view, the vibratory sensor of FIG. 10.

The invention relates to a vibratory gyroscope sensor 1 that advantageously forms a vibratory gyroscope sensor, preferably axisymmetric, of the Coriolis type, that is to say a vibratory sensor based on the Coriolis forces. The vibratory gyroscope sensor 1 is thus a vibratory inertial sensor of the CVG ("Coriolis Vibratory Gyro") type. The vibratory gyroscope sensor 1 according to the invention thus advantageously forms a sensor adapted (i) to measure a rotation angle (gyroscope operation), in which case it acts as a vibratory gyroscope, and/or (ii) to measure a rate of rotation (gyrometer operation), in which case it acts as a vibratory gyrometer, it being understood that said gyrometer can also determine an angle by integrating the angular velocity.

Figure 1:
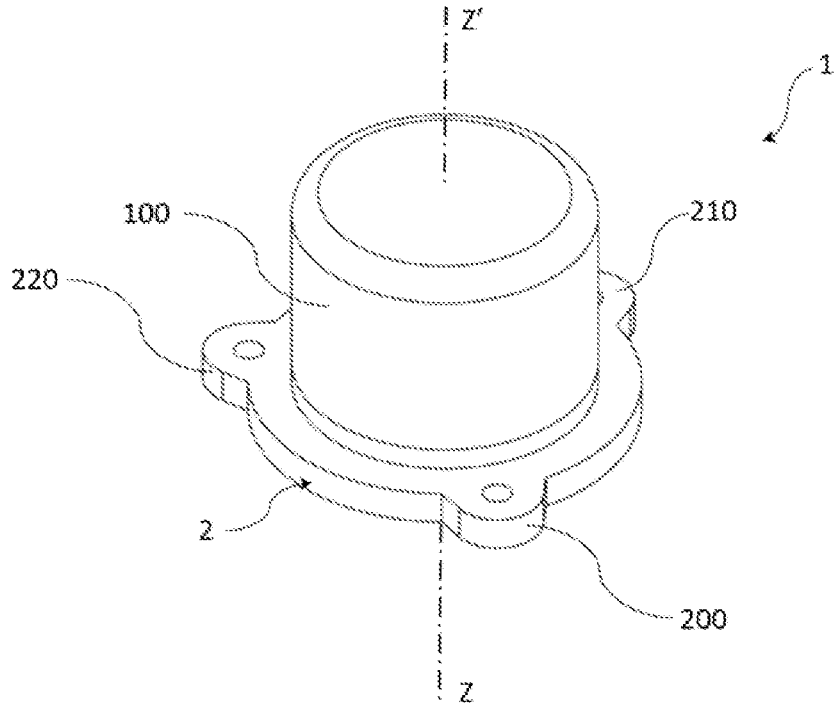
FIG. 1 illustrates, in a perspective schematic view, an axisymmetric vibratory gyroscope sensor according to a first embodiment of the invention.
Figure 2:
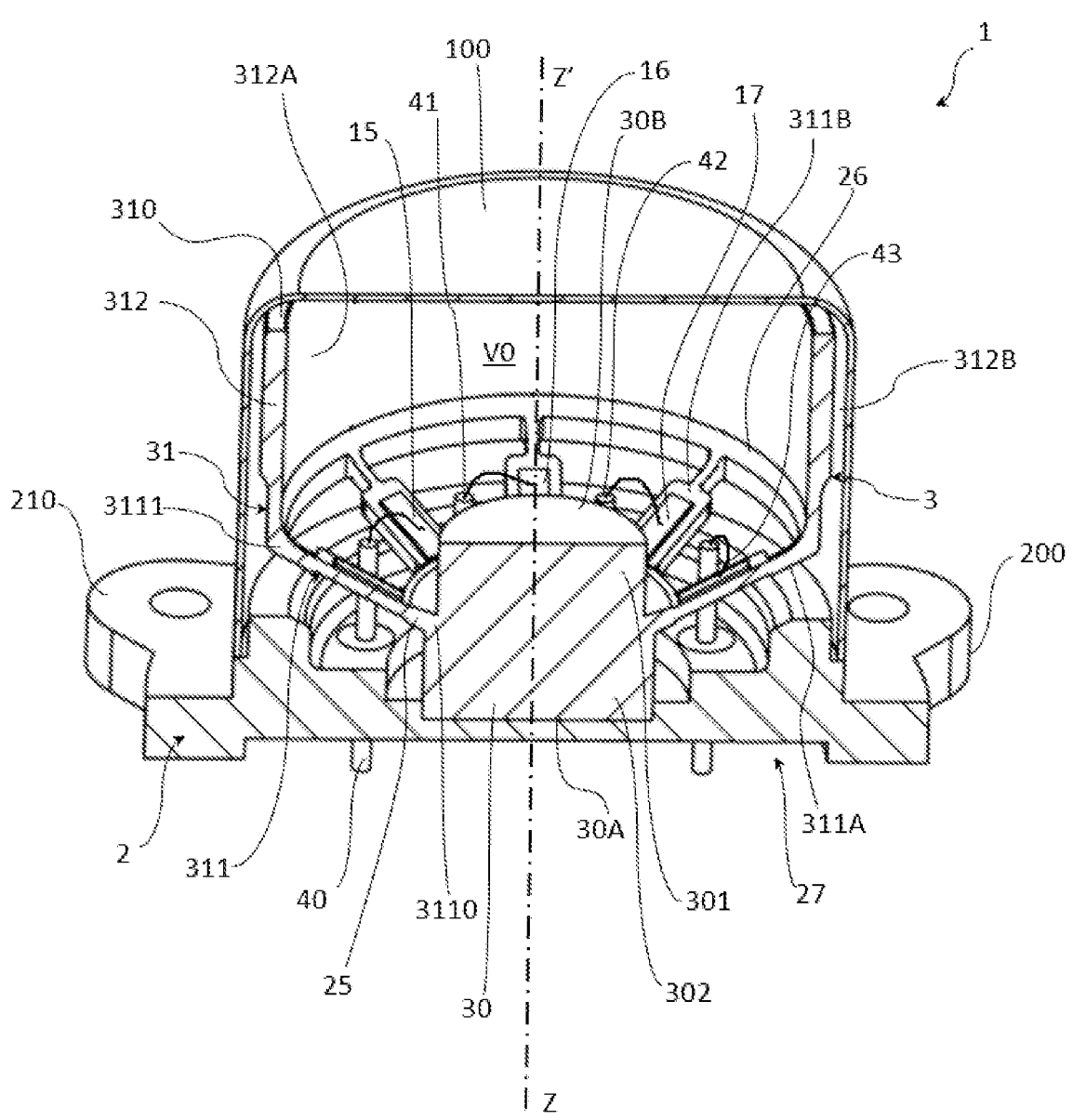
FIG. 2 illustrates, in a sectional perspective schematic view, the vibratory gyroscope sensor of FIG. 1.

As illustrated in the figures, the vibratory gyroscope sensor 1 according to the invention comprises a base 2, which is for example made of metal, and provides a support function. The base 2 thus advantageously forms a pedestal. The base 2 advantageously has an overall plate shape with two opposite sides, separated by the thickness of the plate, which are provided with convex and concave conformations forming accommodations whose functions will be described hereinafter. The base 2 is advantageously provided with fastening means 200, 210, 220, 230, which are for example in the form of a plurality of lugs each passed through by a hole in order to allow the sensor 1 to be screwed to a frame, for example to the frame of an inertial unit or any other equipment. As illustrated by FIG. 1, the fastening means 200, 210, 220 of the base 2 can be adapted to provide an isostatic fastening, in which case the fastening lugs 200, 210, 220 are three in number, equiangularly distributed around a central axis Z-Z', which is advantageously normal to the mean plane in which extend the fastening lugs and/or the plate forming the base 2. Preferably, the base 2 has in this case a 3rd-order discrete rotational symmetry about the central axis Z-Z'. Said central axis Z-Z' corresponds to the sensitive axis along which the vibratory gyroscope sensor 1 is adapted to measure an angular velocity and/or an angular displacement. In the alternative embodiment of FIG. 9, the fastening lugs 200, 210, 220, 230 are this time four in number, equiangularly distributed around the central axis Z-Z', and provide a hyperstatic fastening, which is certainly more cumbersome than the isostatic fastening of the variant of FIG. 1 but allows limiting the mechanical disturbances of the vibratory gyroscope sensor 1 thanks to a two-by-two alignment of the fastening lugs 200, 210, 220, 230 along two orthogonal axes X-X', Y-Y', perpendicular to the central axis Z-Z'. In this embodiment of FIG. 9, the base 2 has this time advantageously a 4th-order discrete rotational symmetry about the central axis Z-Z'. Other fastening configurations can be contemplated without departing from the scope of the invention, as for example a ring surrounding the sensor base and squeezed by a plate constrained by external screws.

Advantageously, the vibratory gyroscope sensor 1 according to the invention comprises a bell-shaped cap 100, that comes above the vibrating structure (resonator 3 described hereinafter) of the sensor 1. Said cap 100 is made for example of a metal material, and is advantageously intended to cooperate with the base 2 to delimit with the latter an internal space intended to receive the vibrating structure (resonator 3 described hereinafter) of the vibratory gyroscope sensor 1, in order to isolate and protect it from the external environment. The accommodation so formed by the base 2 and the cap 100 can advantageously be gas-tight, thanks to the implementation of suitable sealing means arranged at the interface between the cap 100 and the base 2, which makes it possible to control the atmosphere within the accommodation in question.

The vibratory gyroscope sensor 1 according to the invention also comprises a resonator 3 that forms a proof body intended to vibrate in response to an excitation. Advantageously, the resonator 3 has at least one 2nd-order resonance mode divided into a primary mode and a secondary mode that are modally orthogonal to each other, with for example elliptic deformations (case of a resonator having a shape of revolution), and in principle of same frequencies. The resonator 3 includes, as illustrated in the figures, a central foot 30 by which the resonator 3 is attached to said base 2. In other words, the vibratory gyroscope sensor 1 comprises mechanical connection means that provide a fastening of the central foot 30 to the base 2. Advantageously, said mechanical connection means provide a clamping connection between the central foot 30 and the base 2, in order to immobilize the central foot 30 relative to the base 2. The mechanical connection means have for example a definitive nature, that is to say they are non-detachable, and can consist for example of an assembly by welding or brazing of the foot 30 and the base 2.

Preferably, the foot 30 has substantially a shape of revolution, about said central axis Z-Z', and extends longitudinally along said central axis Z-Z' between an external side 30A, which is preferably flat and is for example received in an accommodation formed in the base 2 (as illustrated in the figures), and a free internal side 30B, which is preferably also flat. Advantageously, said central foot 30 has a massive and monolithic nature, i.e. it is formed by a one-piece, monobloc part, preferably made of metal. Therefore, said central foot 30 is not in the form of a wall, and in particularly a tubular wall, but is on the contrary of solid nature.

The resonator 3 also includes a sidewall 31, which is also preferably made of metal, but that can alternatively be made of an amorphous material such as silica, or a monocrystalline material such as quartz. Said sidewall 31 is distinct from said foot 30, which means in particularly that the foot 30 does not belong to the sidewall 31. The foot 30 advantageously connects the sidewall 31 to the base 2. Advantageously and as illustrated, the foot 30 has a reduced cross-section with respect to that of the base and that of the sidewall 31, in such a way that the vibratory gyroscope sensor 1 has a cross-sectional restriction between the base 2 and the sidewall 31, which cross-sectional restriction corresponds to the foot 30. The sidewall 31 rises from the foot 30, about and from the periphery of the latter, up to a free end edge 310 delimiting an opening that gives access to an internal volume V0 delimited by the foot 30 and the sidewall 31. The resonator 3 thus advantageously has a general shape of container open on the side opposite to the base 2, defining a cavity inside which it is possible to access from the outside, via the opening delimited by the free end edge 31.

Advantageously, the central foot 30 and the sidewall 31 form a single and same one-piece part, the sidewall 31 advantageously coming from the same material as the foot 30. In other words, the foot 30 and the sidewall 31 form a single and same one-piece part, which is preferably entirely made of metal, said foot 30 and sidewall 31 being moreover distinct from each other.

In accordance with the invention, the sidewall 31 comprises a proximal portion 311 that rises from and around the central foot 30, and is distinct from the latter. Said sidewall 31 advantageously has a rotational symmetry about the central axis Z-Z', whether it is a continuous symmetry (symmetry of revolution—embodiment not illustrated in the figures), or a discrete rotational symmetry of order n, with n≥3, and more preferentially n≥4, and even more preferentially n≥8. Advantageously, the proximal portion 311 has an external face 311A that extends on the side of the base 2, i.e. preferably opposite the latter, and an opposite internal face 311B, which extends opposite the internal volume V0. Said external face 311A and internal face 311B are advantageously substantially parallel to each other.

The sidewall 31 also has a distal portion 312, generally cylindrical in shape, that extends in line with the proximal portion 311 up to said free end edge 310. Preferably, said distal portion 312 thus extends from the proximal portion 311 up to the free end edge 310. As illustrated in the figures, the distal portion 312 advantageously has the general shape of a straight cylinder, and even more advantageously the general shape of a straight circular cylinder. In this advantageous embodiment, the distal portion 312 has a general shape of revolution about the central axis Z-Z'.

As illustrated in the figures, the distal portion 312, which advantageously has the general shape of a straight circular cylinder, preferentially extends between a primary circular edge, integral with the proximal portion 311 and a secondary circular edge that corresponds to said free end edge 310, said primary circular edge being arranged between the base 2 and the secondary circular edge. Preferably, the cylindrical distal portion 312 has an internal distal face 312A arranged opposite the internal volume V0, and an opposite, external distal face 312B. Advantageously, the internal distal face 312A is uniform and continuous. Preferably, the distance that separates the internal distal face 312A from the central axis Z-Z' is constant at any point of said internal distal face 312A, over substantially the whole height of the latter (said height being measured along a direction parallel to the central axis Z-Z'). Advantageously, the distal portion 312 has an internal diameter D between 10 and 40 mm, preferably between 20 and 30 mm, even more preferably substantially equal to 23 mm. The diameter D in question here corresponds to the internal diameter of the straight cylinder forming the proximal portion 312 of the sidewall 31, i.e. to the diameter of the internal distal face 312A. Advantageously, the distal portion 312 has a thickness between 0.5 and 3 mm, preferably between 0.5 and 1.5 mm. Preferably, the thickness of the cylindrical distal portion 312 varies along the height, with, for example:

a distal main portion that advantageously extends up to the free end edge 310 and whose thickness is substantially constant and has a first value E1, which is for example equal to about 1 mm, and a distal connection portion that extends between said distal main portion 312 and the proximal portion 311 and whose thickness, preferentially constant, has a second value E2 lower than the first value E1.

Such a thickness variation makes it possible to adjust at best the resonance modes of the resonator 3, and also helps improve the detection of vibrations. It is however perfectly conceivable that the thickness of the cylindrical distal portion 312 is constant over the whole height of the latter, without thereby departing from the scope of the invention.

Advantageously, the vibratory gyroscope sensor 1 comprises a plurality of excitation devices attached to said proximal portion 311 to excite said resonator 3 into vibration, and more precisely to excite the cylindrical distal portion 312 into vibration, and in particular said symmetric primary and secondary vibration modes of the latter. Advantageously, the vibratory gyroscope sensor 1 also comprises a plurality of detection devices attached to said proximal portion 311 to detect vibrations of the resonator 3, and in particular the vibrations of the cylindrical distal portion 312 excited by the excitation devices attached to the proximal portion 311. This positioning of the excitation and detection devices on and against the proximal portion 311 makes it possible in particular to limit any potential damping effects likely to generate measurement errors. The detection and excitation elements may be of similar or different natures, and be based for example on the detection, respectively excitation, principle, of electrostatic, optical, electromagnetic and/or piezoelectric nature, without this list being limiting.

Advantageously, the vibratory gyroscope sensor 1 comprises piezoelectric elements 14, 15, 16, 17, 18, 19, 20, 21, 22, 23, 24 that form said excitation devices and said detection devices. The piezoelectric elements in question are thus designed so as, on the one hand, to impart, through the proximal portion 311 to which they are fastened (for example by bonding or by brazing), vibrations to the distal portion 312, to excite in particular the symmetric primary and secondary resonance modes, and on the other hand, to detect, here again through the proximal portion 311 to which they are attached, the vibrations of the distal portion 312. The piezoelectric elements thus provide a double function of vibratory excitation on the one hand and of vibration detection on the other hand.

In accordance with an important feature of the invention, the proximal portion 311 progressively widens from the foot 30 towards the distal portion 311. As illustrated in the figures, the external face 311A and the internal face 311B widen progressively from the foot 30 towards the distal portion 311, that is to say that said external face 311A and internal face 311B both progressively move away from the central axis X-X' as they rise from the foot 30 towards the distal portion 312. In other words, the proximal portion 311 has, at its connection with the foot 30, a cross-section that is smaller than its cross-section at its connection with the distal portion 312. The proximal portion 311 thus progressively moves away from the central axis Z-Z' as it rises from the foot 30 towards the distal portion 312. Preferably, the foot 30 does not have a flared shape, but rather a substantially straight one as illustrated in the figures. Advantageously, the proximal portion 311 extends between, on the one hand, a first circular edge 3110 connected to said foot 30, here laterally to the latter, and in the other hand, a second circular edge 3111 connected to the distal portion 312 and from which said distal portion 312 rises up to said free end edge 310. Said first and second circular edges 3110, 3111 have a first and a second diameter, respectively, the latter being substantially equal or slightly smaller than said diameter D of the distal portion 312. Due to the flared nature of the proximal portion 311, said second diameter is greater than said first diameter. Even more advantageously, the first diameter represents at most 60% of the second diameter, and even more preferentially at most 50% of the second diameter. Using a proximal portion 311 having generally a pavilion profile, whose cross-section increases progressively along the height (materialized by the central axis Z-Z'), from the foot 30 towards the distal portion 312, makes it remarkably easy to reject parasitic modes, and in particular the parasitic drum mode, by ensuring that it has a frequency far higher than that of the primary and secondary modes. It turns out that using a proximal portion 311 that is inclined with respect to the central axis Z-Z', i.e. which is neither parallel nor perpendicular to said central axis Z-Z', makes it possible to increase the stiffness of the resonator 3, in particular for the parasitic drum mode, and to a lesser extent for the parasitic flexural mode. Thanks to this feature, the frequency of the parasitic drum mode is not at all close to the frequency ranges of the primary and secondary vibration modes of the resonator 3 used to measure the angular rotation, which provides a particularly powerful and robust gyroscope sensor 1. Moreover, this configuration allows raising the frequency of the parasitic flexural mode to significantly avoid the frequency range up to 2 kHz.

Advantageously, in order to optimize this frequency differentiation effect for the primary and secondary modes on the one hand and the parasitic modes (in particular, drum) on the other hand, said sidewall 31 and proximal portion 311 (which belongs to the sidewall 31) raise over a total height HT and a first height H1, respectively, both measured along a direction parallel to the central axis Z-Z', which are such that said first height H1 represents at least 15% of said total height HT, preferably at least 25% of said total height HT.

In a particularly preferential manner, and in accordance with the embodiment illustrated in the figures, said proximal portion 311 has a frustoconical profile, and more precisely a straight circular frustoconical profile. In other words, the proximal portion 311 advantageously extends along a generally frustoconical (fictive) surface, that is to say a cone portion diverging from the foot 30 towards the outside and towards the distal portion 312. Using a proximal portion of generally frustoconical shape of axis Z-Z' to connect the foot 30 to the cylindrical distal portion allows obtaining an optimum level of rigidity, in particular for the parasitic drum mode, which makes it possible to very efficiently offset upwards the frequency of this parasitic mode.

Preferably, said cone has a symmetry axis, which here corresponds to the central axis Z-Z', and is inclined with respect to a plane P perpendicular to said symmetry axis by an angle α between 10° and 45°, preferably between 25° and 35°, even more preferentially equal to about 30°. Using a proximal portion 311 of generally frustoconical profile inclined by such an angle conducted at particularly high frequencies for the parasitic drum mode, which facilitates the rejection of this parasitic mode because the frequencies of the latter are far higher than those of the primary and secondary resonance modes used for angle and/or rate of rotation measurement. For example, it is possible to obtain primary and secondary resonance modes whose frequencies are in the range 5,000-8,000 Hz, whereas the frequency of the parasitic drum mode is higher than 10,000 Hz, for a resonator whose distal portion has the shape of a straight cylinder with an internal diameter of about 23 mm and a wall thickness of about 1 mm and whose proximal portion has the shape of a frustoconical surface with an inclination, corresponding to said angle α, of about 30°.

Advantageously, the proximal portion 311 includes a plurality of arms 6, 7, 8, 9, 10, 11, 12, 13 separated from each other by clear spaces and arranged equiangularly around said foot 30. Each of said arms 6, 7, 8, 9, 10, 11, 12, 13 extends longitudinally between a central end arranged on the side of the foot 30, and preferably connected to the latter, and a peripheral end arranged on the side of the distal portion 312, and preferably connected to the latter. In this preferential embodiment, the proximal portion 311 is formed by a discrete discontinuous surface, said arms 6, 7, 8, 9, 10, 11, 12, 13 being distant and distinct from each other and extending radially with respect to the central axis Z-Z', from the foot 30. In this case, each arm 6, 7, 8, 9, 10, 11, 12, 13 extends along a flared fictive surface, which is advantageously frustoconical in shape, as already exposed hereinabove. This means that each of the arms 6, 7, 8, 9, 10, 11, 12, 13 is advantageously inclined by an angle $\alpha$ with respect to said plane P perpendicular to the central axis Z-Z, said angle $\alpha$ being for example between 10 and 45°, preferably between 25 and 35°, even more preferentially equal to about 30°, as mentioned hereinabove. In this preferential embodiment illustrated in the figures, the proximal portion 311 has a discrete rotational symmetry of order n about the central axis Z-Z', with advantageously n≥3, and even more preferentially n≥4, the number n advantageously corresponding to the number of arms 6, 7, 8, 9, 10, 11, 12, 13 forming said proximal portion 311. Particularly advantageously, the proximal portion 311 includes eight arms 6, 7, 8, 9, 10, 11, 12, 13, in which case it has a discrete rotational symmetry of order 8 (n=8) about the central axis Z-Z'. However, it is perfectly conceivable to use a smaller or greater number of arms, and for example to use 16 arms, in which case the proximal portion 311 has this time a discrete rotational symmetry of order 16 about the central axis Z-Z'. It is also perfectly conceivable that the proximal portion 311 is formed by a continuous surface, for example by a frustoconical surface (in which case the proximal portion 311 has a shape of revolution about the central axis Z-Z'), possibly punctually pierced by equiangularly distributed through-openings.

Advantageously, each of the arms 6, 7, 8, 9, 10, 11, 12, 13 extends longitudinally in straight line between its central and peripheral ends. Each arm 6, 7, 8, 9, 10, 11, 12, 13 is for example formed by a rigid leg that connects the foot 30 to the cylindrical distal portion 312. The arms 6, 7, 8, 9, 10, 11, 12, 13 thus form flat spokes, which extend radially with respect to the central axis Z-Z', around and from the foot 30 to connect the latter to the distal portion 312.

Advantageously, said excitation devices and said detection devices, preferentially formed by the piezoelectric elements 14, 15, 16, 17, 18, 19, 20, 21, 22, 23, 24, are attached to said arms 6, 7, 8, 9, 10, 11, 12, 13, so that each of said arms carries at least one, and possibly two (or more) piezoelectric elements 14, 15, 16, 17, 18, 19, 20, 21, 22, 23, 24. The excitation and detection devices advantageously formed by the piezoelectric elements 14, 15, 16, 17, 18, 19, 20, 21, 22, 23, 24 are thus advantageously equiangularly distributed around the central foot 30, because they each extend in alignment with one of the arms 6, 7, 8, 9, 10, 11, 12, 13, on and against the latter. Using separate arms 6, 7, 8, 9, 10, 11, 12, 13 to transmit, by means of the piezoelectric elements they are provided with, vibrations to the distal portion 312, makes it possible to force the vibrations of the resonator 3 to adopt a defined direction, which allows obtaining increased performances, in an extremely simple and efficient way.

Advantageously, each arm 6, 7, 8, 9, 10, 11, 12, 13 has at least one flat face on and against which is arranged and fastened one of said piezoelectric elements 14, 15, 16, 17, 18, 19, 20, 21, 22, 23, 24 forming an excitation and detection device. Using a flat face as a fastening support for the piezoelectric elements 14, 15, 16, 17, 18, 19, 20, 21, 22, 23 allows obtaining an excellent electromechanical coupling, which favours the accuracy and reliability of the measurements. For example, each of said arms 6, 7, 8, 9, 10, 11, 12, 13 includes at least:

a main section 6A, 7A, 8A, 9A, 10A, 11A, 12A, 13A which extends from said central end arranged on the side of the foot 30, an end section 6B, 7B, 8B, 9B, 10B, 11B, 12B, 13B of reduced cross-section with respect to the main section 6A, 7A, 8A, 9A, 10A, 11A, 12A, 13A and that extends between the latter and said peripheral end arranged on the side of the distal portion 312.

Preferably, the end section 6B, 7B, 8B, 9B, 10B, 11B, 12B, 13B of reduced cross-section extends in line with the main section 6A, 7A, 8A, 9A, 10A, 11A, 12A, 13A, with preferably a clean break in cross-section between the main section 6A, 7A, 8A, 9A, 10A, 11A, 12A, 13A and the end section 6B, 7B, 8B, 9B, 10B, 11B, 12B, 13B that extends it. Preferably, the piezoelectric elements 14, 15, 16, 17, 18, 19, 20, 21, 22, 23, 24 are arranged on and against the main section 6A, 7A, 8A, 9A, 10A, 11A, 12A, 13A, which has the shape of a flat leg with two opposite main faces contributing to form the external face 311A and the internal face 311B, respectively, of the proximal wall 311. In the embodiment of FIGS. 1 to 6, the piezoelectric elements are arranged on the arms 6, 7, 8, 9, 10, 11, 12, 13 only on the side of the internal face 311B, inside the internal volume V0. This internal positioning of the piezoelectric elements, on the internal face 311B of the proximal portion 311 (which very advantageously has a frustoconical profile), provides a particularly compact nature to the vibratory gyroscope sensor 1 according to the invention, which thus makes it possible to come as close as possible to base 2 of the resonator 3, without being hindered by the presence of the excitation and detection devices which are placed in the internal volume V0. The implementation of excitation and detection devices attached to the internal face 311B of the proximal portion 311 further allows enhancing the accuracy of the angle and angular velocity measurements. As an alternative, in the embodiment of FIG. 7, the piezoelectric elements are exclusively arranged on and against the arms 6, 7, 8, 9, 10, 11, 12, 13, on the side of the external face 311A. Finally, in the alternative embodiment of FIG. 8, each arm is equipped with two piezoelectric elements arranged on each of its opposite faces, one on the side of the external face 311A and the other on the side of the opposite, internal face 311B, each arm being thus interposed between two piezoelectric elements.

In all the cases mentioned hereinabove, each piezoelectric element is advantageously carried by the main section 6A, 7A, 8A, 9A, 10A, 11A, 12A, 13A of the arm 6, 7, 8, 9, 10, 11, 12, 13 in question. Thanks to this particular configuration, the piezoelectric elements are able not only to optimally transmit to the resonator 3 vibratory mechanical stresses causing the distal portion 312 to resonate according to the primary and secondary modes, but also to provide an accurate and reliable detection of the vibrations, while limiting the parasitic mechanical stresses, in particular in torsion, which can be applied to these same piezoelectric elements along the nodal directions. Indeed, each end section 6B, 7B, 8B, 9B, 10B, 11B, 12B, 13B of reduced cross-section acts as a hinge that avoids transmitting to the main section 6A, 7A, 8A, 9A, 10A, 11A, 12A, 13A potential torsional efforts resulting from the vibrations of the resonator 3. The bottleneck formed by the end section 6B, 7B, 8B, 9B, 10B, 11B, 12B, 13B of reduced cross-section thus provides increased local rotational flexibility that limits any local torsional effects in the nodal directions (at 45° of the vibration directions of the primary and secondary modes) in the corresponding main section 6A, 7A, 8A, 9A, 10A, 11A, 12A, 13A. This particular geometry, with a main section that carries one or several detection or excitation piezoelectric elements, and an end section of reduced cross-section that plays the role of a hinge for connecting the main section to the distal portion 312, allows filtering out, by construction, the parasitic rotational and/or torsional mechanical stresses likely to interfere with the measurements. In this particular embodiment, the efficiency of the piezoelectric elements is improved not only in terms of resonance mode activation, but also in terms of vibration detection accuracy, thanks to the flexible mechanical connection effect obtained by the presence of the cross-section restriction at the end of the main section of each arm.

Advantageously, the proximal portion 311 comprises a first flange 25 that extends from and around the foot 30, i.e. said first flange 25 forms an annular radial skirt, which follows the flared profile of the proximal portion 311, and extends for example along a frustoconical profile from the foot 30, from which it originates. Said first flange 25 has advantageously a solid, continuous surface. It thus forms a rim protruding from the foot 30, each central end of each of said arms 6, 7, 8, 9, 10, 11, 12, 13 being integral with said first flange 25, as illustrated in the figures. Advantageously, the proximal portion 311 comprises a second flange 26 that extends through the distal end 312, towards the inside of the resonator 3, i.e. towards the central axis Z-Z'. Advantageously, each peripheral end of each of said arms 6, 7, 8, 9, 10, 11, 12, 13 is integral with said second flange 26, as illustrated in the figures. As illustrated in the figures, said second flange 26 advantageously extends from the primary circular edge of the distal portion 312, towards the foot 30, according to the flared profile of the proximal portion 311, and for example according to a frustoconical profile. Thanks to the presence of at least one of said first and second flanges 25, 26, the vibratory excitation stresses produced by the piezoelectric elements attached to the arms 6, 7, 8, 9, 10, 11, 12, 13 can be communicated extremely efficiently to the distal portion 312 in order to make the latter resonate according to the primary and secondary modes. Reciprocally, this configuration with one or two flanges 25, 26 also allows improving the detection of the vibrations by the piezoelectric elements in question.

Advantageously, the vibratory gyroscope sensor 1 comprises electronic processing and control means, which include for example an electronic board (not shown) housed at least partly in the base 2, preferably in an accommodation 27 formed at the external surface of the base 2, on the side opposite to that from which extends the resonator 3. The base 2 thus advantageously extends between the electronic board on the one hand and the resonator 3 on the other hand. In order to electrically connect the piezoelectric elements 14, 15, 16, 17, 18, 19, 20, 21, 22, 23, 24, that preferentially form the excitation and detection devices, to the above-mentioned electronic board, the vibratory gyroscope sensor 1 advantageously comprises conductive rods 40, 41, 42, 43, 44, 45, 46, 47 (i.e. rods made of an electrically conductive material, for example a metal). Said conductive rods 40, 41, 42, 43, 44, 45, 46, 47 are electrically connected to said piezoelectric elements 14, 15, 16, 17, 18, 19, 20, 21, 22, 23, 24 by micro-cables. Each conductive rod 40, 41, 42, 43, 44, 45, 46, 47 advantageously has a substantially rigid nature, whereas the micro-cable are soft and flexible and are, for example, made of metal (preferably, aluminium or gold). The effective mass of each micro-cable is advantageously negligible, so as not to impact the quality of the measurements obtained by means of the vibratory gyroscope sensor 1. Each conductive rod 40, 41, 42, 43, 44, 45, 46, 47 has advantageously suitable size and shape so that the resonance frequencies of each rod are far higher than 8,000 Hz, which makes is possible to limit the occurrence of additional parasitic modes associated with the rods. Each conductive rod 40, 41, 42, 43, 44, 45, 46, 47 is advantageously arranged in correspondence with a respective one of said clear spaces that separate the arms 6, 7, 8, 9, 10, 11, 12, 13 from each other. That way, the micro-cables can be easily connected to the piezoelectric elements. The conductive rods are preferably arranged so as not to enter, or to enter in a limited way (for example over less than 10%, and preferably less than 5%, even more preferably less than 1%, of their height) into the internal volume V0, which here again makes it possible to limit the risk of disturbing the measurements. More precisely, each conductive rod 40, 41, 42, 43, 44, 45, 46, 47 extends preferably between a lower end, which is electrically connected to the electronic board arranged in the accommodation 27, and an upper end at which is attached the micro-cable that connects the conductive rod in question to one of the above-mentioned piezoelectric elements, and more precisely to a piezoelectric element arranged adjacent to the clear space opposite which the conductive rod extends. The conductive rods 40, 41, 42, 40, 44, 45, 46, 47 advantageously pass trough a support wall of the base 2, through passages formed through said support wall and provided with insulating bushings (for example, made of glass) locally forming an electrically insulating sheath that surrounds each conductive rod to avoid it to enter into contact with said support wall, which is preferably metallic. The conductive rods 40, 41, 42, 43, 44, 45, 46, 47 thus pass through the base 2 up to emerge into the accommodation 27, where they are electrically connected to the electronic board.

Advantageously, the foot 30 comprises an internal portion 301 protruding on the side of the internal face 311B, that is to say extending into the internal volume V0, said internal portion 301 being ended by the free internal face 30B. Preferably, and as illustrated for example by FIGS. 10 and 11, the resonator 3 comprises a connection fillet that extends around said internal portion 301, preferably remote from said free internal face 30B, to connect said internal portion 301 to said internal face 311B. The connection fillet 5 advantageously has a general shape of revolution about said axis Z-Z'. Preferably, said connection fillet 5 has a radius of curvature at least equal to 1 mm, preferably at least equal to 2 mm. The connection fillet 5 thus forms a curved junction surface, which provides a progressive connection of the external sidewall of the foot 30 to the internal face 311B of the proximal portion 311, said connection fillet being preferably tangent to the foot 30 and the internal face 311B, as illustrated in FIGS. 10 and 11. Thanks to the presence of the connection fillet 5, en particular when the latter has a radius of curvature at least equal to 2 mm, the frequency of the parasitic rotational mode can be brought to a high level, far beyond the frequency range of the primary and secondary modes. This feature thus contributes to facilitate the rejection of the parasitic rotational mode.

Advantageously, the central foot 30 comprises an external portion 302 protruding on the side of the external face 311A of the proximal portion 311. Advantageously, said external portion 302 of the foot 30 extends longitudinal, along the central axis Z-Z', between the external face 30A and said first circular edge 3110. The external portion 302 is thus advantageously ended by the external face 30A, which comes into a concavity of conjugate shape formed at the surface of the base 2. Advantageously, said external portion 302 has a local cross-section restriction 302A, as illustrated in FIGS. 10 and 11. Said local cross-section restriction 302A advantageously forms a concave surface to which is con- nected said external face 311A. Said local cross-section restriction 302A is for example in the form of a circular groove having a substantially U-shaped cross-section, with a rounded bottom, formed locally at the surface of the external portion 302, over the whole perimeter of the latter. Preferably, the groove bottom has a radius of curvature at least equal to 1 mm, preferably at least equal to 2 mm. Advantageously, the external face 311A extends, at least locally, in line with the wall of the circular groove in question. Thanks to the presence of this local diameter reduction of the central foot 30, near the region of connec- tion of the foot 30 to the proximal portion 311, under the latter (that is to say between the base 2 and the external face 311A), a certain mechanical flexibility is obtained at the connection between the proximal portion 311 and the central foot 30, which contributes to a natural filtering of the parasitic modes and also makes it possible to compensate to some extent for the damping generated by the brazing joint, or possible the conductive glue, that preferentially provides the mechanical connection between the central foot 30 and the base 2. For example, the combined implementation of the internal fillet 5 and the local cross-sectional restriction 302A, with each a radius of curvature of about 2 mm, makes it possible to raise the frequency of the parasitic rotational mode far beyond those of the primary and secondary modes. Moreover, using a foot 30 having a short free length (that is to say a free external portion 302 of small height) allows increasing the frequency of the parasitic flexural mode to more than 2,500 Hz, or even 3,000 Hz. For that purpose, the length L0 of said external portion 302 between said external face 30A and said first circular edge 3110, measured along the central axis Z-Z', is advantageously lower than or equal to 5 mm, preferably between 2 and 5 mm.

The invention claimed is:

1. A vibratory gyroscope sensor comprising:
a base,
a resonator that includes a central foot by which the resonator is attached to said base and a sidewall that extends from said foot up to a free end edge delimiting an opening,
wherein said sidewall has a proximal portion and a cylindrically shaped distal portion, said proximal por- tion extending from and around said foot, said cylin- drically shaped distal portion extending from said proximal portion up to said free end edge, said proxi- mal portion flaring out from the foot towards the distal portion,
wherein said proximal portion includes a plurality of arms separated from each other by clear spaces and arranged equiangularly around said foot, each of said arms extending longitudinally between a central end arranged on the side of the foot and a peripheral end arranged on the side of the distal portion,
wherein the vibratory gyroscope sensor comprises a plu- rality of excitation devices attached to said proximal portion to excite said resonator into vibration, as well as a plurality of detection devices attached to said proximal portion to detect vibrations of said resonator, and
wherein said excitation devices and/or said detection devices are attached to said arms.

2. The vibratory gyroscope sensor according to claim 1, wherein said proximal portion extends between a first cir- cular edge connected to said foot, and a second circular edge connected to said distal portion and from which the distal portion extends up to said free end edge, said first and second circular edges having such a first and a second diameter, respectively, that said first diameter represents at most 60% of the second diameter, said proximal portion having an external face that extends on the side of the base and an opposite, internal face, said foot comprising an external portion protruding on the side of the external face.

3. The vibratory gyroscope sensor according to claim 2, wherein said external portion has a local cross-sectional restriction forming a concave surface to which said external face is connected.

4. The vibratory gyroscope sensor according to claim 2, wherein said foot comprises an internal portion protruding on the side of said internal face, said resonator comprising a connection fillet that extends around said internal portion to connect the internal portion to said internal face.

5. The vibratory gyroscope sensor according to claim 1, wherein said foot is monolithic.

6. The vibratory gyroscope sensor according to claim 5, wherein the central foot and the base are assembled by welding or brazing.

7. The vibratory gyroscope sensor according to claim 1, wherein each of said arms includes at least:
a main section, which extends from said central end, and an end section of reduced cross-section with respect to that of the main section and that extends between the main section and said peripheral end.

8. The vibratory gyroscope sensor according to claim 1, wherein said proximal portion comprises a first flange that extends from and around said foot, each first end of each of said arms being integral with said first flange.

9. The vibratory gyroscope sensor according to claim 8, wherein said proximal portion comprises a second flange that extends from the distal portion towards the inside of the resonator, each second end of each of said arms being integral with said second flange.

10. The vibratory gyroscope sensor according to claim 1, wherein it comprises piezoelectric elements that form said excitation devices and said detection devices.

11. The vibratory gyroscope sensor according to claim 10, wherein it comprises conductive rods electrically connected to said piezoelectric elements by micro-cables.

12. The vibratory gyroscope sensor according to claim 1, wherein said proximal portion has a straight circular frus- toconical profile.

13. The vibratory gyroscope sensor according to claim 12, wherein said straight circular frustoconical profile is defined from a cone that has a symmetry axis and is inclined with respect to a plane (P) perpendicular to said symmetry axis by an angle (a) between 10 and 45°.

* * * * *